UNITED STATES PATENT OFFICE 2,625,536

NEUTRAL ESTERS OF DICARBOXYLIC ACID ORTHOPHOSPHORIC ACID MIXED ANHYDRIDES AND CONDENSATION POLYMERIZATION PROCESS UTILIZING THE SAME

James Emory Kirby, Wilmington, Del., assignor to E. I. du Pont de Nemours and Company, Wilmington, Del., a corporation of Delaware No Drawing. Application May 5, 1951,
Serial No. 224,850

13 Claims. (Cl. 260—78)

This invention relates to new organic phosphorus compounds useful as polyamide intermediates and more specifically, to mixed phosphoric anhydrides of dicarboxylic acids and their use in the preparation of polyamides.

Since the early work of Carothers (see for instance U. S. 2,071,250, 2,071,251, and 2,071,253) in the field of high molecular weight linear condensation polymers, these polymers have become established as a major industry. This is particularly true for the diamine/dibasic acid polyamides. Continuing work further exploring this field has revealed the desirability of incorporating intrachain or lateral functional substituents into the polyamide molecules, for improved dyeability, easier handling, and facilitation of modification, etc. However, the incorporation of such elements has proven exceedingly difficult to accomplish without deterioration in the other desirable properties of the dibasic acid/diamine polyamides—largely traceable to the fact that the most successful and normally used synthesis route lies in the thermal condensation reaction between the complementary difunctional amide-forming ingredients. The high temperatures, e. g., 225–275° C. and the length of time, e. g., one to four hours, required for carrying out this type of synthesis are quite detrimental to the quality of the product formed when extrafunctional intermediates are used, presumably due to undesirable side reactions involving the extra functionalities. Accordingly, a need has long been felt for a successful, low-temperature route to the high molecular weight polyamides, particularly as applied to such polyamides containing units carrying intrachain or extralinear excess functionalities.

A recent, efficacious, low-temperature polymerization method of preparation of alpha-amino acid polyamides from the N-carboanhydrides of the respective acids (see for instance the copending applications of: MacDonald, filed August 5, 1947, Serial No. 766,457; MacDonald and Schreiber, filed August 12, 1949, Serial No. 110,024; Cleaver and Schreiber, filed January 19, 1949, Serial No. 71,765; MacDonald and Tullock, filed August 2, 1949, Serial No. 108,237), although producing excellent polymers of outstanding properties, can only be applied to the solely alpha- and beta-amino acid polyamides since the required intermediates, i. e., the N-carboanhydrides, have thus far only been demonstrated to be preparable from the alpha- and beta-amino-carboxylic acids.

Another low-temperature polymerization route to alpha-amino acid-containing polyamides (see for instance B. I. O. S. final report No. 1472, item No. 22, pages 40 and 41) involves the bis-azlactones as intermediates and leads to polyamides containing dibasic acid, diamine, and alpha-amino acid units. This method, because of the nature of the required intermediates, while producing excellent polymers of many desirable properties, cannot be applied to the preparation of the solely dibasic acid/diamine type polyamides.

This invention has as an object a new process for the preparation of high molecular weight polyamides. A further object is the preparation of new intermediates for polyamides. Other objects will appear hereinafter.

These objects are accomplished by the invention of acyl-bis-orthophosphate diesters, wherein each of the two orthophosphate diester groups contains two organic radicals, alike or different (preferably hydrocarbon), free of Zerewitinoff active hydrogen, the two phosphate phosphori each being singly bonded through anhydride oxygen to a carbonyl carbon of a divalent, non-Zerewitinoff-active-hydrogen-containing, diacyl radical of a dicarboxylic acid, said divalent radical having at least six chain carbons, and the reaction of these acyl-bis-orthophosphate diesters with essentially equimolecular proportions of diamines containing two amino-hydrogen bearing amine groups, which other than such hydrogens are free of Zerewitinoff active hydrogen.

The acyl-bis-orthophosphate diesters of this invention are of the formula

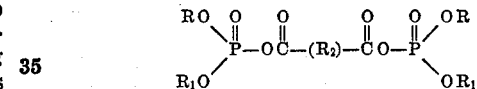

wherein R and $R_1$ are monovalent organic radicals, usually of no more than 18 carbons each, alike or different, free of reactive, i. e., Zerewitinoff active, hydrogen.

R and $R_1$ can, if desired, be together joined so that with the two ester oxygens and the phosphate phosphorus a five or six membered heterocycle is formed. $R_2$ is a divalent organic radical free of Zerewitinoff active hydrogen and of at least four intrachain carbon atoms.

Because of their greater ease of preparation and greater efficiency in the polyamide-forming reaction, those acyl-bis-orthophosphate diesters which are, apart from orthophosphate phosphorus, oxygen attached thereto and to the two carboxyl carbons, solely hydrocarbon, are preferred. These are compounds of the structure given above wherein R, $R_1$, and $R_2$ are solely hydrocarbon radicals. This increased ease in preparation becomes particularly apparent with the hydrocarbon acyl-bis-orthophosphate diesters free of aliphatic unsaturation, i. e., compounds of the above formula wherein R, R₁, and R₂ are hydrocarbon radicals free of aliphatic unsaturation.

The following examples in which parts are by weight are illustrative of the invention.

EXAMPLE I

*Preparation of adipyl-bis(dibenzyl phosphate)*

A solution of 9.15 parts of freshly distilled adipyl chloride in about 28 parts of anhydrous diethyl ether is added dropwise with stirring over a period of 0.5 hour to an ice cold suspension of 38.5 parts (two molar proportions) of silver dibenzyl phosphate in about 350 parts of anhydrous diethyl ether under anhydrous conditions and under subdued light. The reaction mixture is then stirred at ice bath temperature for one hour and then at room temperature for five hours. The silver chloride precipitate is then removed by suction filtration and the solid washed several times with anhydrous diethyl ether. The washings are combined with the clear ether filtrate, and the solution allowed to stand overnight at 5° C. during which time a small quantity of white crystalline product separates out. The ether solvent is removed from the solution by distillation at room temperature under reduced pressure. There is thus obtained 13.6 parts (40.8% of theory) of adipyl-bis(dibenzyl phosphate) as white crystals melting over the range 50–57° C.

Analysis:
Calculated for $C_{34}H_{36}P_2O_{10}$: P, 9.29%.
Found: P, 8.97%.

The product exhibits a positive test for acyl phosphate when treated with hydroxylamine and ferric chloride by the method of Lipmann and Tuttle, J. Biol. Chem., 159, 21–8 (1945). The product is further characterized as adipyl-bis-(dibenzyl phosphate) through the preparation of N,N'-dibenzyladipamide and N,N'-diphenyladipamide as follows:

A solution of benzylamine in boric acid/borax buffer (pH 7.4) is mixed with the above adipyl-bis(dibenzyl phosphate) dissolved in dioxane. A white precipitate forms almost immediately and is isolated by filtration. Recrystallization of this solid from a mixture of ethanol and water gives colorless platelets of N,N'-dibenzyladipamide melting at 187.5–189.0° C. Dermer and King, J. Org. Chem., 8, 168–173 (1943) report a melting point of 188–189° C. for N,N'-dibenzyladipamide.

To a solution of the above adipyl-bis(dibenzyl phosphate) in benzene is added aniline and the mixture allowed to stand at room temperature for two days. The resulting crystalline product is removed by filtration and washed with dilute hydrochloric acid to remove admixed anilinium dibenzyl phosphate. The remaining crystalline residue is recrystallized from dilute ethanol. There is thus obtained white platelets of N,N'-diphenyladipamide melting at 241–242° C. vs. a reported melting point of 240–241° C. by Hill, J. Am. Chem. Soc., 52, 4110 (1930).

Analysis:
Calculated for $C_{18}H_{20}N_2O_2$: C, 72.95%; H, 6.79%
Found: C, 72.46%; H, 6.94%

EXAMPLE II

*Preparation of adipyl-bis(dibutyl phosphate)*

To a cooled (3° C.) solution of 31.53 parts (2 molar proportions) of dibutyl hydrogen phosphate and 13.73 parts (one molar proportion) of freshly distilled adipyl chloride in about 142 parts of anhydrous diethyl ether is added dropwise with stirring over a period of 0.5 hour a solution of 16.5 parts (two molar proportions) of triethylamine in about 42 parts of anhydrous diethyl ether. The reaction mixture is maintained below 5° C. with stirring for an additional hour and then for four hours at room temperature. The white precipitate of triethylamine hydrochloride is removed by filtration and the solid washed with a small quantity of cold anhydrous diethyl ether. The ether washings and the clear filtrate are combined and the diethyl ether solvent removed by distillation at room temperature under reduced pressure. There is thus obtained 36.1 parts (89.2% of theory) of adipyl-bis(dibutyl phosphate) as a liquid exhibiting $n_D^{25}$ of 1.4438 and soluble in methanol, acetone, diethyl ether, benzene, dioxane, pyridine, ethyl acetate, and nitromethane but insoluble in water and a petroleum ether of boiling range 60–71° C.

Analysis:
Calculated for $C_{22}H_{44}P_2O_{10}$: C, 49.79%; H, 8.36%; P, 11.67%
Found: C, 49.74%; H, 8.51%; P, 11.60%

The adipyl-bis(dibutyl phosphate) exhibits a positive test for acyl phosphate by the Lipmann and Tuttle method (see Example I). The product is somewhat unstable, thermally decomposing to the extent of 16% on heating for one hour at 110° C., thus preventing accurate boiling point determination. A sample of the adipyl-bis(dibutyl phosphate) reacts with aniline in benzene solution at room temperature to give crystalline N,N'-diphenyladipamide as white platelets melting at 241–242° C. Samples of the adipyl-bis(dibutyl phosphate) in ⅔ distilled water/dioxane solutions hydrolyze at the rate of 5.8% per hour and in ⅔ boric acid-borax buffer/(pH 7.4) dioxane solutions hydrolyze at 6.2% per hour.

EXAMPLE III

*Preparation of terephthalyl-bis(dibutyl phosphate)*

To a cooled (3° C.) solution of 14.45 parts (one molar proportion) of freshly distilled terephthalyl chloride and 30.0 parts (two molar proportions) of dibutyl hydrogen phosphate in about 210 parts of anhydrous diethyl ether is added dropwise with stirring, a solution of 15.0 parts (two molar proportions) of triethylamine in about 15 parts of anhydrous diethyl ether at such a rate that the temperature of the reaction mixture does not exceed 5° C. The reaction mixture is maintained below 5° C. with stirring for an additional three hours and then for one hour at room temperature. The white precipitate of triethylamine hydrochloride is removed by suction filtration through a layer of amorphous diatomaceous silica and the solid washed with a small quantity of cold anhydrous diethyl ether. The ether washings and the clear filtrate are combined and the diethyl ether solvent removed by distillation at room temperature under reduced pressure. The residue is maintained for three hours under a pressure corresponding to 0.2 mm. of mercury at room temperature to remove any residual traces of triethylamine or the ether solvent. There is thus obtained 35.0 parts (89.2% of theory) of terephthalyl-bis(dibutyl phosphate) as a viscous liquid exhibiting a negative test for chlorine with alcoholic silver nitrate and a positive test for acyl phosphate when treated with hydroxylamine and ferric chloride by the method of Lipmann et al.—see Example I.

EXAMPLE IV

*Preparation of diglycolyl-bis(dibutyl phosphate)*

To a cooled (ice/water bath) solution of 38 parts (molar proportion) of diglycolyl chloride and 94 parts (two molar proportions) of dibutyl hydrogen phosphate in about 140 parts of anhydrous diethyl ether is added dropwise with rapid stirring under anhydrous conditions, a cooled (ice/water bath) solution of 46.4 parts (two molar proportions) of triethylamine in about 40 parts of anhydrous diethyl ether at such a rate that the temperature of the reaction mixture is maintained below 15° C. A heavy, white precipitate of triethylamine hydrochloride forms. After the triethylamine is added, the reaction mixture is stirred for one hour at 10–15° C. and 2.5 hours more at room temperature. The triethylamine hydrochloride is removed by filtration through a layer of amorphous diatomaceous silica and the white solid washed with cooled anhydrous diethyl ether. The ether solvent is removed from the combined ether washings and clear filtrate by distillation under reduced pressure without the application of heat. There is thus obtained as a residue 108 parts (93% of theory) of diglycolyl-bis(dibutyl phosphate) as a clear, viscous liquid.

Analysis:

Calculated for $C_{20}H_{40}P_2O$: P, 11.96%
Found: P, 11.56%

The diglycolyl-bis(dibutyl phosphate) product exhibits a negative test for ionizable halogen with alcoholic silver nitrate solution and a positive test for acyl phosphate in the manner of Lipmann, et al. (see Example I). The product is further characterized as diglycolyl-bis(dibutyl phosphate) by the formation of polyhexamethylenediglycolamide when treated with an aqueous buffered solution of hexamethylenediamine and also by the formation of N,N'-diphenyldiglycolamide when treated with a chloroform solution of aniline. This dianilide is a white crystalline material melting at 155.0–155.5° C. vs. a reported melting point of 152° C. [Huntress and Mulliken, Identification of Pure Organic Compounds, Order I, page 110 (1:0495)—Original ref.: Anschütz, Biernaux, Ann. 273, 67 (1893).]

Analysis:

Calculated for $C_{16}H_{16}N_2O_3$: N, 9.86%
Found: N, 9.81%, 9.86%

EXAMPLE V

*Preparation of adipyl-bis(diphenyl phosphate)*

A solution of 2.29 parts (one molar proportion) of freshly distilled adipyl chloride in about 44 parts of anhydrous benzene is added dropwise with stirring under anhydrous conditions and with subdued light over a period of about 0.5 hour to an ice-cold suspension of 10.55 parts (2.36 molar proportions) of silver diphenyl phosphate in about 175 parts of anhydrous benzene. The reaction mixture is then stirred at ice-bath temperature for one hour and then at room temperature for two hours. The silver chloride precipitate and the unreacted silver diphenyl phosphate are then removed by suction filtration and the mixture of solids washed several times with anhydrous benzene. The washings are combined with the clear benzene filtrate and the solution allowed to stand overnight at 5° C. The benzene solvent is then removed by distillation at room temperature under reduced pressure. The white solid residue thereby obtained is adipyl-bis(diphenyl phosphate). This product exhibits a positive test for acyl phosphate in the manner of Lipmann, et al. (see Example I) and a negative test for ionizable halogen with alcoholic silver nitrate solution. The product is further characterized as adipyl-bis(diphenyl phosphate) through the preparation of N,N'-diphenyladipamide as follows:

To a solution of the above adipyl-bis(diphenyl phosphate) in benzene is added aniline and the mixture allowed to stand at room temperature for a few hours. The resulting crystalline product is removed by filtration and washed with dilute hydrochloric acid to remove admixed anilinium diphenyl phosphate. The remaining crystalline residue is recrystallized from 2-B alcohol. There is thus obtained fine, white crystals of N,N'-diphenyladipamide melting at 239–240° C. The reported melting point is 240–241° C. (see Example I).

EXAMPLE VI

*Preparation of polyhexamethyleneadipamide by heterogeneous dispersion polycondensation in an aqueous buffer*

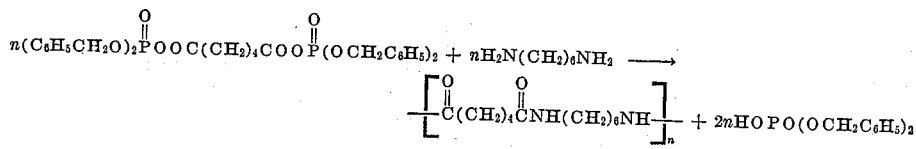

A solution of 0.58 part of hexamethylenediamine in about 75 parts of boric acid/borax buffer solution of pH 7.4 is prepared in a pressure vessel, and 3.33 parts (an equimolar proportion based on the diamine) of adipyl-bis(dibenzyl phosphate), prepared as described previously in Example I, is added. The pressure resistant reactor containing the heterogeneous aqueous dispersion is then sealed and heated at 35° C. for 20 hours with constant shaking in a thermostated rocker bath. At the end of this time, the pressure vessel is cooled to room temperature, opened, and the dispersion reaction mixture removed. The white polyhexamethyleneadipamide product is removed by filtration and dried, and then dissolved in about 10 parts of molten phenol at about 50–70° C. The phenolic solution is filtered to remove small traces of undissolved material, and the polyhexamethyleneadipamide product reprecipitated by the addition of about 45 parts of commercial ethyl acetate. The reprecipitated polyamide product is then removed by filtration, washed with ether, and finally dried at 100° C. in a vacuum oven. There is thus obtained 1.80 parts of pure, dry polyhexamethyleneadipamide melting at 254–256° C. with slight decomposition. The infrared spectrum of the polyhexamethyleneadipamide product indicates clearly the presence of the —CONH— grouping and checks very well with the infrared spectrum of polyhexamethyleneadipamide prepared by the standard thermal condensation of a 1/1 adipic acid/hexamethylenediamine salt. Viscosity measurements carried out at 25° C. on m-cresol solutions of the polyhexamethyleneadipamide product indicated the following inherent viscosities at the respective concentrations expressed in units of grams of the polyamide per 100 cc. of solution: 0.40 at 0.1 concentration, 0.44 at 0.3 concentration, and 0.46 at 0.5 concentration. These data correspond to an intrinsic viscosity of approximately 0.385, which corresponds to a molecular weight of about 6500 as calculated from the modified Staudinger equation using the values for the Huggins constants previously established for polyhexamethyleneadipamides prepared in the normal thermal condensation fashion.

EXAMPLE VII

*Preparation of polyhexamethyleneadipamide by heterogeneous dispersion polycondensation in a strongly basic, aqueous medium*

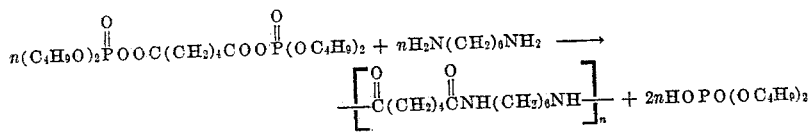

A solution of 1.16 parts of hexamethylenediamine in about 50 parts of 0.5 N aqueous sodium hydroxide solution is added at room temperature to 5.30 parts (an equimolar proportion based on the diamine) of adipyl-bis(dibutyl phosphate), prepared as described previously in Example II. The resulting heterogeneous aqueous dispersion is shaken at room temperature for six hours during which time a white precipitate forms. At the end of this time the precipitate is removed from the reaction mixture by suction filtration, water washed, and dried in a vacuum oven at 100° C. There is thus obtained 1.71 parts (76% of theory) of polyhexamethyleneadipamide as a white solid melting at 247–250° C. and exhibiting an inherent viscosity of 0.37 in m-cresol solution at 25° C. at a concentration of 0.5 gram of polyamide per 100 cc. of solution. In the following examples dealing with the preparation of various polyamides the inherent viscosities will be those obtained under these conditions unless otherwise specified.

Similar experiments substituting high-speed, vigorous stirring for the shaking and using about 1.0 N aqueous potassium or lithium hydroxide solutions give 60–70% yields of polyhexamethyleneadipamide melting at 252–255° C. and exhibiting inherent viscosities of 0.50 and 0.50. Other parallel experiments using benzene solutions of the diamine give 65–71% yields of the polyamide melting at 248–255° C. and of inherent viscosities of 0.23–0.25.

EXAMPLE VIII

*Preparation of polyhexamethyleneadipamide by heterogeneous dispersion polycondensation in weakly basic, aqueous medium*

A heterogeneous dispersion of 9.1 parts of adipyl-bis(dibutyl phosphate) is prepared by adding the adipyl-bis(dibutyl phosphate) in a dropwise manner slowly with vigorous high-speed stirring to a solution prepared by adding about 10 parts of a commercial, non-ionic detergent comprising a mixture of octylphenyl polyglycol ethers of varying degrees of polymerization and 45 parts of a saturated sodium bicarbonate solution diluted with about 45 parts of distilled water. A solution of two parts (an equimolar proportion based on the phosphate ester) of hexamethylenediamine in 20 parts of distilled water is then added to the dispersion with continued rapid stirring. The mixture is then further stirred at room temperature for an additional 20 minutes. There is thus obtained a heterogeneous, aqueous dispersion of polyhexamethyleneadipamide in which the solid phase remains suspended even after standing for as long as one week. The polyamide cannot be precipitated out of the dispersion through the application of heat but the addition of excess methanol readily breaks the dispersion and the solid polyhexamethyleneadipamide product precipitates out and can be removed by filtration. A sample of the precipitated polyamide, after being removed by filtration and dried, melts at 249–253° C. and exhibits an inherent viscosity of 0.38.

Similar results are obtained using other commercially available detergents in sodium bicarbonate or sodium carbonate solutions with yields in the neighborhood of 70% of theory. Similar results are obtained when the dispersing agents are not added except that the resulting heterogeneous dispersions of the polyamide are less stable.

EXAMPLE IX

*Preparation of polyhexamethyleneadipamide by polymerization in anhydrous media*

A solution of 5.30 parts of adipyl-bis(dibutyl phosphate) in about 30 parts of dry chloroform is added at room temperature to a solution of 1.16 parts (an equimolar proportion based on the phosphate ester) of hexamethylenediamine in about 45 parts of dry chloroform. Within five minutes a white precipitate begins to form and an exothermic reaction is noted. The mixture is shaken for three hours, filtered, and the white precipitate thereby obtained washed with acetone. This solid is dissolved in molten phenol at 50–70° C. and precipitated by the addition of excess commercial ethyl acetate. After a second reprecipitation from phenol in the same manner, the resulting white solid is dried at 100° C. in a vacuum oven. There is thus obtained 1.04 parts (46% of theory) of polyhexamethyleneadipamide as a white solid melting at 248–252° C. and exhibiting a negative qualitative test for phosphorus (as described at page 904 of Vogel, Textbook of Practical Organic Chemistry, Longmans, Green and Co.) and an infrared spectrum corresponding to that of polyhexamethyleneadipamide made by conventional thermal condensation of adipic acid/hexamethylenediamine salts. The product exhibits an inherent viscosity of 0.25 in m-cresol at a concentration of 0.1 gram of polyamide per 100 cc. of solution of 25° C. Upon evaporation of the original chloroform filtrate from the polyamide-forming reaction mixture, a considerable amount of white solid is obtained. This latter material is presumably low molecular weight, chloroform soluble polyhexamethyleneadipamide.

Similar experiments using freshly distilled triethylamine, pyridine, and a $\frac{1}{10}$ triethylamine/dioxane mixture give polyhexamethyleneadipamide, respectively, in 79% yield of melting point 240–244° C. and inherent viscosity 0.28, in 40% yield of melting point 245–248° C. and inherent viscosity 0.21, and in 89% yield of melting point 243–245° C. and inherent viscosity 0.21.

A solution of 1.70 parts (one molar proportion) of freshly distilled 2(4-aminocyclohexyl)-1,1-dimethylethylamine in about 40 parts of 10% aqueous sodium carbonate solution (pH=11.5) is added at room temperature to 5.30 parts (one molar proportion) of adipyl-bis(dibutyl phosphate) and the resulting heterogeneous dispersion shaken at room temperature overnight. At the end of this time the solid, gummy product formed is removed by suction filtration and dissolved in warm dimethylformamide and reprecipitated by the addition of an excess of anhydrous diethyl ether. The resulting light yellow gum is removed and dried in a vacuum oven at 100° C. There is thus obtained 1.36 parts (54% of theory) of the condensation polyamide of 2(4-aminocyclohexyl)-1,1-dimethylethylamine and adipic acid as a hard, light yellow resin exhibiting an inherent viscosity of 0.19.

EXAMPLE XII

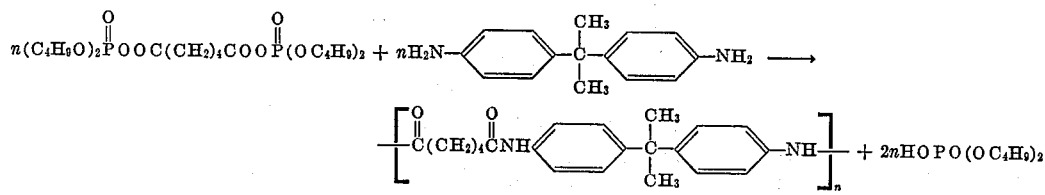

EXAMPLE X

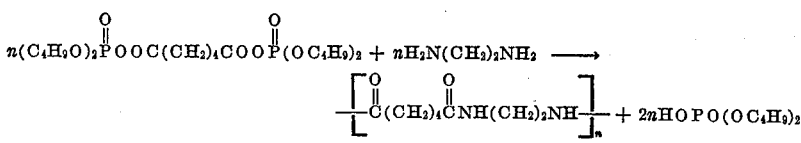

A solution of 0.6 part of freshly distilled ethylenediamine in about 50 parts of 10% aqueous sodium carbonate solution (pH=11.5) is added at room temperature to 5.30 parts (an equimolar proportion based on the diamine) of adipyl-bis-(dibutyl phosphate) and the resulting heterogeneous dispersion shaken vigorously at room temperature for six hours during which time a white precipitate forms. The reaction mixture is allowed to stand at room temperature overnight and the precipitate removed by suction filtration, washed with water, and dried at 110° C. in a vacuum oven. There is thus obtained 1.05 parts (62% of theory) of polyethyleneadipamide as a white solid melting at 297° C. and exhibiting an inherent viscosity of 0.19.

A solution of 2.26 parts of 2,2-bis(p-aminophenyl) propane in about 30 parts of 10% sodium carbonate solution (pH=11.5) is added at room temperature to 5.30 parts (an equimolar proportion based on the diamine) of adipyl-bis(dibutyl phosphate) and the resulting heterogeneous dispersion shaken vigorously at room temperature for four hours and then allowed to stand at room temperature overnight. At the end of this time the white solid which forms during the reaction is removed by suction filtration and washed well with distilled water. After drying in a vacuum oven at 100° C., there is thus obtained 2.80 parts (83% of theory) of the condensation polyamide of 2,2-bis(p-aminophenyl)propane and adipic acid as a white solid melting at 255–264° C. and exhibiting an inherent viscosity of 0.24.

EXAMPLE XIII

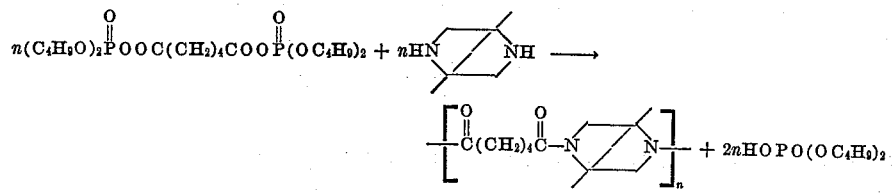

A solution of 1.94 parts of piperazine hexahydrate in about 40 parts of 0.1 N aqueous sodium hydroxide solution is added at room temperature

EXAMPLE XI

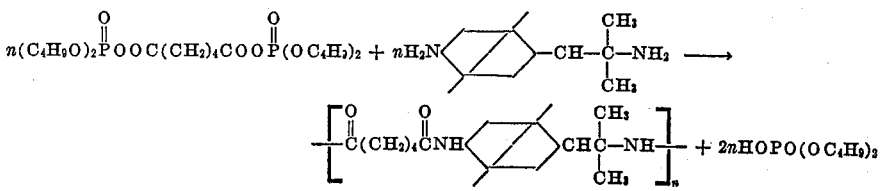

to 5.30 parts (an equimolar proportion based on the diamine) of adipyl-bis(dibutyl phosphate) and the mixture thoroughly shaken. A slight exothermic reaction occurs upon first mixing the two reactants and the resulting heterogeneous dispersion is shaken for two hours and then allowed to stand overnight—both at room temperature. The white solid which forms during the reaction is removed by suction filtration and washed with distilled water and acetone. After drying there is obtained 1.48 parts (78% of theory) of the condensation polyamide of piperazine and adipic acid as a white solid exhibiting an inherent viscosity of 0.24.

EXAMPLE XIV

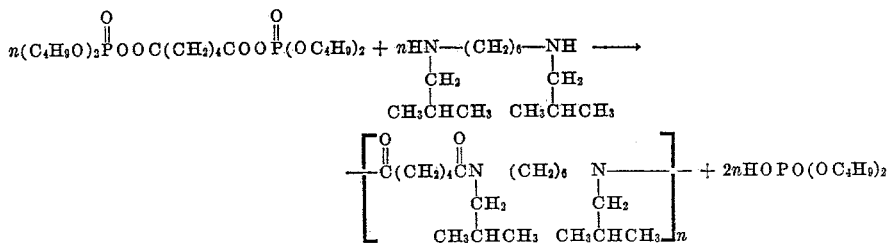

A mixture of 2.28 parts of freshly distilled N,N'-diisobutylhexamethylenediamine in about 40 parts of 0.5 N aqueous sodium hydroxide solution is added at room temperature to 5.30 parts (an equimolar proportion based on the diamine) of adipyl-bis(dibutyl phosphate). A slight exothermic reaction occurs upon first mixing the two reactants and the resulting heterogeneous dispersion is shakin for two hours and then allowed to stand overnight—both at room temperature. The clear, colorless resin which forms during the reaction is removed by suction filtration, washed with distilled water, dissolved in acetone, reprecipitated with excess water, removed by filtration and finally dried in a vacuum oven at 60° C. The condensation polyamide of N,N'-diisobutylhexamethylenediamine and adipic acid is thus obtained as a clear, colorless, tacky resin exhibiting an inherent viscosity of 0.27.

EXAMPLE XV

*Preparation of poly-5-methylenenonamethyleneadipamide*

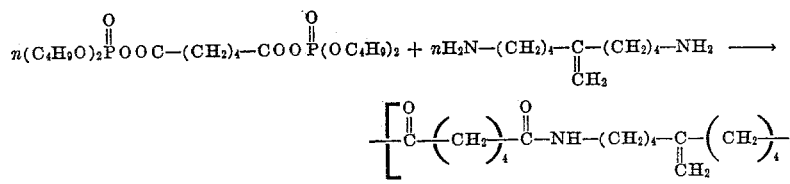

A solution of 3.40 parts of 5-methylene-1,9-nonanediamine in about 30 parts of saturated sodium bicarbonate solution (pH=8.2) is added to 10.60 parts (an equimolar proportion based on the diamine) of adipyl-bis(dibutyl phosphate), and the mixture thoroughly shaken. A slight exothermic reaction occurs upon first mixing the two reactants. The resulting heterogeneous dispersion is shaken mechanically for six hours and the white precipitate formed during the reaction period removed by filtration, washed with sodium bicarbonate solution and finally distilled water. The solid is dissolved in molten phenol at 50–70° C. and reprecipitated by the addition of excess commercial ethyl acetate. After another reprecipitation from phenol in the same manner followed by drying in a vacuum oven at 90° C., there is obtained 3.3 parts (64% of theory) of poly-5-methylenenonamethyleneadipamide as a white solid melting at 168–172° C. and exhibiting an inherent viscosity of 0.42 and an infrared spectrum which indicates the presence of extralinear methylene groups.

Analysis:
Calculated for $[C_{16}H_{28}N_2O_2]_n$: N, 10.00%.
Found: N, 9.64%; 9.63%.

A sample of this polyamide when heated at its melting point for a period of five minutes becomes insoluble in boiling phenol. This result indicates the probable crosslinking of the polyamide through its extralinearly active centers, i. e., the extralinear methylene groups, and serves to indicate the difficulties inherent in preparing linear polyamides from such diamines by conventional high temperature, polyamide-forming reactions.

EXAMPLE XVI

*Preparation of polyhexamethyleneterephthalamide*

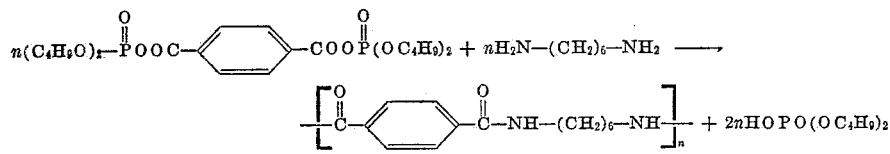

A solution of 1.16 parts of hexamethylenediamine in about 30 parts of saturated sodium bicarbonate solution is added to 5.55 parts (an equimolar proportion based on the diamine) of tere-phthalyl-bis(dibutyl phosphate), prepared as described previously in Example III, and the mixture thoroughly shaken. A slight exothermic reaction ocurs upon first mixing the two reactants and the resulting heterogeneous disperson is shaken mechanically for three hours at room temperature. The white solid which forms is removed by filtration, washed with saturated sodium bicarbonate solution, and finally with distilled water. This white, solid product is dissolved in molten phenol at 50–70° C. and excess commercial ethyl acetate added to the warm viscous solution to reprecipitate the white polymer. After a second precipitation from phenol in the same, the polymer is washed well with acetone and dried in a vacuum oven for 48 hours at 110° C. There is thus obtained 0.95 part (42% of theory) of polyhexamethyleneterephthalamide as a white solid melting above 300° C. and exhibiting an inherent viscosity of 0.16.

EXAMPLE XVII

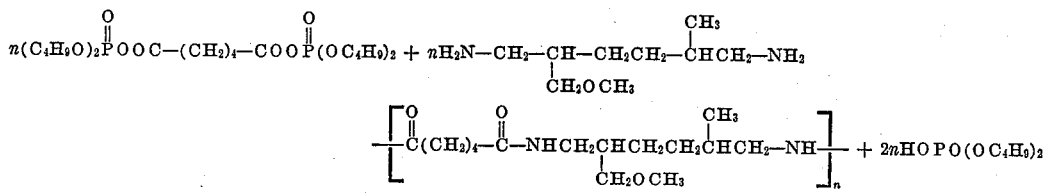

A solution of 1.72 parts of 2-methoxymethyl-5-methylhexamethylenediamine in about 40 parts of saturated sodium bicarbonate solution (pH=8.2) is added to 5.3 parts (an equimolar proportion based on the diamine) of adipyl-bis-(dibutyl phosphate) and the mixture thoroughly shaken. A slight exothermic reaction occurs upon first mixing the two reactants. The resulting heterogeneous dispersion is shaken mechanically for six hours and the supernatant liquid decanted from the gummy colorless precipitate formed during the reaction period. This precipitate is washed separately with acetone and chloroform, dissolved in excess dimethylformamide at room temperature, and the resulting solution poured slowly with stirring into excess anhydrous diethyl ether. The solvent mixture is decanted from the clear, colorless, gummy precipitate so formed and the precipitate dried in a vacuum oven at 70° C. overnight. There is thus obtained poly-2 - methoxymethyl - 5 - methylhexamethyleneadipamide as a clear, glass-like resin exhibiting an inherent viscosity of 0.46 and an infrared spectrum which indicates the presence of linear carbonamide groups.

The preparation of the new acyl-bis-orthophosphate diesters of this invention has been illustrated in Example I by the metathetical reaction between two molar proportions of the silver salt of a dihydrocarbon orthophosphate ester and one molar proportion of a dicarboxylic acid halide. It is to be understood that other phosphate salts with elements of groups IA and IB in the periodic table can be used in this metathetical reaction, for instance, the sodium and potassium salts of the dihydrocarbon substituted orthophosphates. Similarly, these new compounds can be prepared by the reaction between one molar proportion of a dialkali metal or alkaline earth metal salt of the desired dicarboxylic acid and two molar proportions of the required disubstituted monohalophosphate, e. g., diethylchlorophosphate.

In Example II the preparation of an acyl-bis-(dialkyl phosphate) has been illustrated by the reaction between two molar proportions of a dialkyl hydrogen phosphate, two molar proportions of a tertiary aliphatic amine and one molar proportion of a dicarboxylic acid halide. Because of the lower cost for the necessary reactants, as well as the greater effiency in the preparative reaction, it is preferred to prepare the new acyl-bis-orthophosphate diesters of this invention by this method, which is normally carried out at room temperature or below, preferably at 0° to 10° C. This new process, using a tertiary amine wherein the amino nitrogen carries only single bonds, as applied to the synthesis of acyl-orthophosphate diesters and the acyl-bis-disubstituted phosphate esters of this invention, is discussed in greater detail in the application of A. C. Cope and H. L. Jackson, Serial No. 224,832 filed herewith.

The new products of this invention, as has been illustrated in Examples VI to XVII are readily capable of forming, by the process of this invention, high molecular weight, film- and fiber-forming linear polyamides by reaction with diamines in essentially equimolar proportions. This polymerization process can be carried out in anhydrous media at temperatures ranging from −10° or lower, depending on the freezing point of the medium, up to +70° C. and from −5° to +70° C. in aqueous media, e. g., dispersions. Although the process can also be carried out at temperatures in excess of 70° C., at temperatures appreciably above this point, e. g. 100–125° C., the decomposition of the intermediate acyl-bis-orthophosphate diesters becomes noticeable. To avoid as completely as possible any thermal decomposition of the intermediate as well as to facilitate the reaction, it is preferred to carry out the polymerization process at temperatures in the range of 0 to 50° C. in both aqueous and anhydrous systems. Because of the greater efficiency of the polyamide-forming reaction, as well as the convenience and simplicity of the operating equipment required, it is preferred to carry out the process of this invention at room temperature for from one to four hours. Longer reaction times may be used, although no advantage is gained thereby. As is true with most organic reactions, particularly polycondensations, there is no upper limit to the time to which any one given reaction can be carried out. However, reasonable cost requirements and the lack of any advantage gained from longer times result in the process being normally operated for no longer than two hours.

In this polyamide-forming reaction, two moles of by-product monohydrogen orthophosphate diester is formed for every mole of diamine and every two moles of acyl-bis-orthophosphate diester used.

The ester groups of the various by-product monohydrogen orthophosphate diesters will vary with the respective acyl-bis-orthophosphate diester used. The solubility of these by-product esters will vary slightly with the nature of these ester groups and in some cases will not be appreciable in the organic solvents. Hence, although the polyamide-forming reaction can be carried out under anhydrous conditions, i. e., in liquid organic solvent media free of reactive, i. e., Zerewitinoff hydrogens, such as aromatic hydrocarbons, e. g., benzene; halogenated hydrocarbons, e. g., chloroform, chlorobenzene; ethers, e. g., dioxane, tertiary aliphatic amines, e. g., triethylamine, etc., certain of the polyamides prepared in such systems will contain as contaminants large proportions of the by-product phosphate diesters. Accordingly, these polyamides before being used will normally require purification. This can best be carried out by extraction with aqueous alkaline systems. Because these by-product phosphate diesters are relatively strongly acidic and, therefore, capable of salt formation with the condensing diamine, it is desirable in order to facilitate the formation of the dibasic acid/diamine polyamide to remove these by-product diesters from the reaction zone as soon as they are formed. A convenient method of carrying out this neutralization is simply to have present in the reaction zone sufficient base to react with the by-product diesters as rapidly as formed. Organic bases, e. g., tertiary aliphatic amines, may be used and, in fact, are the preferred type for use in organic media. To avoid complications in the polyamide-forming reaction, it is preferred not to use amino-hydrogen-containing amines.

In carrying out the polyamide-forming process of this invention in the preferred aqueous systems, i. e., in heterogeneous dispersion, the systems may be either acid, basic, or neutral. It has been found that better results, as judged by speed of the polyamide-forming process and the quality of the polyamides thereby formed, are obtained when the process is carried out in buffer systems, particularly in those buffer systems which are basic in character, e. g., in systems ranging in pH 7.1 to 14.0. In such systems the buffer serves to neutralize readily the acidic by-product esters formed. Furthermore, the metal phosphates produced by reaction between the buffer and the by-product acidic phosphate esters are readily water soluble and, therefore, easily removed from the product. Examples of such buffer systems include sodium acetate, disodium hydrogen phosphate, sodium bicarbonate, and sodium carbonate solutions, as well as solutions prepared from disodium hydrogen phosphate and potassium dihydrogen phosphate. Other recognized buffered solutions can also be used, for instance, the borax/boric acid buffer specifically exemplified in Example VI. In general, aqueous systems containing alkali metal salts of the weak acids such as acetic, carbonic, boric, and the like, as well as the mono- and dialkali metal salts of phosphoric acid can be used.

The best results, again as judged by speed of polymer condensation and quality of the polyamides thereby produced, are obtained when the process is carried out in an aqueous solution of a strong base, i. e., at pH's ranging from 10, and preferably 12, to 14. Particularly outstanding results have been obtained with aqueous solutions of the alkali metal hydroxides, e. g., those of sodium, potassium, lithium, particularly with 0.1 to 0.5 N solutions. In these strongly basic, aqueous media, there can be present other soluble, basic salts, for instance, a sodium hydroxide solution containing dissolved sodium carbonate and the like.

It has already been pointed out that essentially equimolar proportions of the acyl-bis-orthophosphate diesters of this invention and the requisite diamine are reacted together to form polyamides. Such proportions are preferred in the polyamide-forming reaction although mild variations are within the scope of the invention. For instance, small excesses of the order of up to about 10% of either the acyl-bis-phosphate diester or the diamine can be used. However, both from the standpoint of cost and the quality of the polyamide product formed large excesses of either reactant are to be avoided. Monofunctional stoppers, i. e., viscosity stabilizers, such as monohydric alcohols or monoamines can be employed in the usual small amount. Their use is particularly efficacious when it is desired to produce, e. g., for use in biological fields, low molecular weight polyamides, e. g., those of inherent viscosity, as defined above, of less than 0.10.

The radicals bonded through ester oxygen to phosphorus in the novel esters of this invention while preferably non-aromatic, i. e., aliphatic or cycloaliphatic, may be the radical R of any alcohol or phenol ROH which is, apart from hydroxyl, free from Zerewitinoff active hydrogen, including aliphatic hydrocarbon radicals, e. g., methyl, ethyl, allyl, propyl, butyl, isoamyl, hexyl, octyl, dodecyl, octadecyl; substituted aliphatic hydrocarbon radicals, e. g., beta-chloroethyl, methoxymethyl, beta-carboethoxyethyl; alicyclic radicals, e. g., cyclohexyl; aromatic hydrocarbon radicals, e. g., phenyl, naphthyl; substituted aromatic hydrocarbon radicals, e. g., p-chlorophenyl, beta-bromonaphthyl, m-ethoxyphenyl, p-carbomethoxyphenyl; cycloaliphatic and substituted cycloaliphatic hydrocarbon radicals, e. g., cyclohexyl, 4-chlorocyclohexyl; aralkyl and substituted aralkyl hydrocarbon radicals, e. g., benzyl, beta-phenylethyl, beta-(4-chlorophenyl)ethyl, p-methoxybenzyl; heterocyclic radicals, e. g., furfuryl, thienyl; etc. The carbon bonded to ester oxygen is preferably carbinol carbon.

It has similarly been previously pointed out that the divalent diacyl radical joining through anhydride oxygen the two phosphate ester groups in the new acyl-bis-phosphate esters of this invention can be the diacyl radical of any dicarboxylic acid of at least six chain carbons free of reactive, i. e., Zerewitinoff active, hydrogens, i. e., any dicarboxylic acid of at least six chain carbons, whose only active, i. e., Zerewitinoff hydrogens are the two carboxyl hydrogens. Particular examples of the dicarboxylic acids which, less the two carboxyl hydroxyl groups, constitute the diacyl radicals of the new acyl-bis-phosphate diesters of this invention are saturated, aliphatic, dicarboxylic acids, e. g., adipic, pimelic, suberic, azelaic, sebacic, hendecanedioic, dodecanedioic, brassylic, thapsic, and eicosanedioic acids; unsaturated aliphatic dicarboxylic acids, e. g., alpha-hydromuconic, beta-hydromuconic, 4-amyl-2,5-heptadienedioic, 3-hexynedioic, 4,6-decadienedioic, and 2,9-dimethyl-2,4,6,8-decatetraenedioic acids; substituted saturated and unsaturated aliphatic acids, e. g., 4-keto-pimelic acid; aromatic dicarboxylic acids, e. g., phthalic, isophthalic, terephthalic, naphthalic and diphenic acids; substituted and unsubstituted aromatic aliphatic dicarboxylic acids, e. g., 3-carboxycinnamic acid; substituted and unsubstituted cycloaliphatic dicarboxylic acids, e. g., cis- and trans-1,4-cyclohexanedicarboxylic acids; substituted and unsubstituted cycloaliphatic/aliphatic dicarboxylic acids, e. g., 1,2-cyclohexanediacetic and 2-carboxy-2-methyl-cyclohexaneacetic acid; substituted and unsubstituted heterocyclic dicarboxylic acids, e. g., dinicotinic, quinolinic, acridinic, and 3,4-quinolinedicarboxylic acids; aliphatic dicarboxylic acids containing intrachain heteroatoms (i. e., heterocatenic oxygen, nitrogen, or sulfur), e. g., thio-bis-propionic acid, oxy-bis-propionic acid, ethylimino-bis-propionic acid, bis(carboxypropoxyethane), and thio-bis-butyric acids, thio-bis(5- methylhexanoic acid), and sulfonyl-bis(5-methylhexanoic acid).

The acyl-bis-orthophosphate diesters of this invention vary from liquids to solids as a function of molecular weight, i. e., as a function of the carbon atoms in the carbon skeletons of the dicarboxylic acid radical and the four ester radicals. For instance, adipyl-bis(dibenzyl phosphate) is a solid; whereas, adipyl-bis(dibutyl phosphate) is a liquid. As pointed out previously in Examples I and II, these new acyl-bis-orthophosphate diesters react with two molar proportions of amino hydrogen-containing monoamines to form the corresponding diamides of the dicarboxylic acids, the divalent diacyl radical of which joins the two phosphate ester groups. Similarly, as pointed out in Examples VI through XVII the acyl-bis-orthophosphate diesters of this invention react with diamines containing hydrogen on both amino nitrogens to form the corresponding dibasic acid/diamine polyamides. The acyl-bis-orthophosphate diesters also react with monoalcohols and glycols to form the corresponding esters and polyesters. Similar reactions are known to occur with the monofunctional acyl phosphate diesters. As has been pointed out in Example II, the acyl-bis-orthophosphate diesters hydrolyze at appreciable rates of the order of about 6% per hour under mild conditions to the corresponding dicarboxylic acid (the divalent diacyl radical of which joins the two phosphate ester groups) and monohydrogen orthophosphate diesters. These acyl-bis-orthophosphate diesters decompose with appreciable rapidity at moderately elevated temperatures in the neighborhood of 100° C. to 125° C.

Although the present invention is generic to those acyl-bis-phosphate diesters wherein the diacyl radical is that of any dicarboxylic acid of at least six chain carbons free of reactive, i. e., Zerewitinoff active, hydrogens, other than the two carboxylic acid hydrogens, and although many specific compounds illustrating this broad class have been given immediately above, those acyl-bis-phosphate diesters of this invention, wherein the diacyl radical is solely hydrocarbon other than the two acyl carbonyl, i. e., non-oxocarbonyl, groups, are preferred because such compounds can be more readily and more conveniently prepared from cheaper and more readily available intermediates. Those esters which, apart from phosphorus and oxygen attached thereto or to carbonyl carbon, are aliphatically saturated, i. e., free from unsaturation other than aromatic unsaturation and preferably saturated aliphatic hydrocarbon are particularly preferred. However, it should be pointed out that the new acyl-bis-phosphate diesters of this invention can contain other functions, e. g., keto groups, i. e., both extralinear and with the carbonyl carbon intrachain, extralinear ester groups, intrachain heteroatoms, and the like, in the chain joining the two acyl carbonyl groups. Such compounds have a particular utility in that they offer a ready low-temperature route to dibasic acid/diamine polyamides containing such goups in the dibasic acid moiety. Conventional methods, i. e., thermal condensation, are rather unsatisfactory for the preparation of such polyamides.

The new acyl-bis-orthophosphate diesters of this invention are particularly outstanding because of their ability to react with essentially equimolar proportions of diamines thereby forming conveniently at moderate temperatures film- and fiber-forming dibasic acid/diamine polyamides of high molecular weight, i. e., having in solution in m-cresol at a concentration of 0.5 gm. per 100 cc. of solution an inherent viscosity at 25° C. of at least 0.10. Particular examples of the diamines which may be so reacted include saturated aliphatic primary and secondary diamines, e. g., ethylenediamine, 1,3-propanediamine, putrescine, cadaverine, decamethylenediamine, 1,2-propanediamine, 1,2-butanediamine, and N, N'-diethylethylenediamine; unsaturated aliphatic primary and secondary diamines, e. g., 5 - methylenenonane - 1,9-diamine; substituted saturated and unsaturated aliphatic primary and secondary diamines, e. g., 2-methoxymethyl-5-methylhexamethylenediamine, 2-dimethylaminomethyl - 5-methylhexamethylenediamine, 3-dimethylaminohexamethylenediamine, 3 - (2-hydroxyethoxy) hexamethylenediamine, 2-hydroxy-1,3 - propanediamine, 3 - [2(methoxymethoxy) - ethoxy]hexamethylenediamine, and N-2-chloroethyl-N'-ethylenediamine; aromatic primary and secondary diamines, e. g., ortho-phenylenediamine, meta-phenylenediamine, para-phenylenediamine, 1,4-anthradiamine, 1,4-naphthalenediamine, 3,3'-biphenyldiamine, N,N'-diethyl-1,4-phenylenediamine, and 3,4 - biphenyldiamine; substituted and unsubstituted aromatic/aliphatic primary and secondary diamines, e. g., p-aminobenzylamine, bis(4-aminophenyl)methane, bis-(4-methylaminophenyl)methane and 1,2-bis(4-aminophenyl)ethane; substituted and unsubstituted cycloaliphatic primary and secondary diamines, e. g., 4,4'-diaminodicyclohexane, 1,4-cyclohexanediamine, and N,N' - dimethyl-1,4-cyclohexanediamine; substituted and unsubstituted cycloaliphatic/aliphatic primary and secondary diamines, e. g., bis(p-aminocyclohexyl)-methane, bis(p-methylaminocyclohexyl)methane, bis(p-aminocyclohexyl)ethane, bis-(p-aminocyclohexyl)butane; substituted and unsubstitued heterocyclic primary and secondary diamines, e. g., 2,6-diaminopyridine, piperazine, 2,5-diamino-1,3,4-thiodiazole; aliphatic diamines containing intrachain heteroatoms (oxygen, nitrogen, or sulfur), e. g., bis-(2-methyl-6-aminohexyl)sulfide, thio-bis-(5-methylhexylamine), oxy-bis-propylamine, bis-aminopropoxyethane, ethylimino-bis-propylamine; aromatic diamines containing intrachain heteroatoms, e. g., 4,4'-diaminodiphenyl ether, 4,4'-diaminodiphenyl sulfide. The diamine can contain amino groups other than the two hydrogen-containing amino groups provided the extra amino groups are tertiary.

Although the process of the present invention is generic to the reaction of the new acyl-bis-phosphate esters with diamines containing two amino hydrogen-containing amine groups, it is preferably applied to diamines which other than the two amino nitrogens are solely hydrocarbon since such compounds are more readily available at lower cost. However, the process of this invention, operating as it does in the lower temperature ranges, becomes particularly important as applied to the preparation of polyamides from diamines containing other functionalties, e. g., ketone groups, ester groups, intrachain heteroatoms, lateral and intrachain tertiary amine groups, and the like, since the known polyamide forming reactions, i. e., thermal condensation, are rather unsatisfactory for the preparation of polyamides from such diamines.

The new acyl-bis-orthophosphate diesters of this invention are useful for other purposes than in the low temperature formation of the dibasic acid/diamine type condensation polyamides. For instance, they may be used as intermediates in the preparation of other useful organic compounds. They may be reacted with alcohols and glycols to form the corresponding carboxylic acid esters and polyesters. These new acyl-bis-phosphate diesters are also useful as biologically active compounds, particular as aphicides and miticides.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Adipyl-bis(dibutyl phosphate).
2. An adipyl-bis(dialkyl phosphate).
3. A neutral monohydric alcohol ester of a mixed anhydride in which anhydride each carboxyl of a saturated aliphatic dicarboxylic acid of at least six chain carbons is anhydridized with a molecule of orthophosphoric acid.
4. A neutral monohydric alcohol ester of a mixed anhydride in which anhydride each carboxyl of an aliphatic dicarboxylic acid of at least six chain carbons is anhydridized with a molecule of orthophosphoric acid.
5. A neutral monohydric alcohol ester of a mixed anhydride in which anhydride each carboxyl of a dicarboxylic acid of at least six chain carbons is anhydridized with a molecule of orthophosphoric acid.
6. A process for the preparation of linear polyamides, of inherent viscosity, in solution in m-cresol at 25° C. at a concentration of 0.5 g. of polyamide/100 cc. of solution, of at least 0.10, which comprises reacting a diamine whose only Zerewitinoff active hydrogen is hydrogen on each amino nitrogen at a temperature of −10 to +70° C. with a neutral monohydric alcohol ester of a mixed anhydride wherein each carboxyl of a dicarboxylic acid of at least six chain carbons is anhydridized with a molecule of orthophosphoric acid in which ester both hydroxyls of each phosphoric acid moiety of the mixed anhydride are esterified.
7. A process for the preparation of linear polyamides which comprises reacting a diamine whose only Zerewitinoff active hydrogen is hydrogen on each amino nitrogen at a temperature of −10 to +70° C. with a neutral monohydric alcohol ester of a mixed anhydride wherein each carboxyl of a dicarboxylic acid of at least six chain carbons is anhydridized with a molecule of orthophosphoric acid in which ester both hydroxyls of each phosphoric acid moiety of the mixed anhydride are esterified.
8. Process of claim 7 wherein the diamine is, apart from the two nitrogens and hydrogen thereon, wholly hydrocarbon.
9. A process for the preparation of linear macromolecular polyamides which comprises reacting a polyamine having hydrogen on each of but two amino nitrogens at a temperature within the range −10 to +70° C. with a symmetrical monohydric alcohol ester of a mixed anhydride wherein each carboxyl of a dicarboxylic acid of at least six chain carbons is anhydridized with a molecule of orthophosphoric acid in which ester both hydroxyls of each phosphoric acid moiety of the mixed anhydride are esterified.
10. Process of claim 9 wherein the diamine is, apart from amino nitrogen and hydrogen thereon, wholly hydrocarbon.
11. Process of claim 10 wherein the ester is, apart from phosphorus, carbonyl, and oxygen thereto connected, wholly hydrocarbon.
12. Process of claim 10 wherein the ester, other than phosphorus, carbonyl, and oxygen thereto connected, and the diamine, other than the amino nitrogens, are hydrocarbon free of aliphatic unsaturation.
13. An acyl-bis-(orthophosphate diester) of the formula

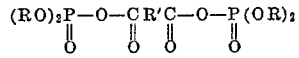

wherein each R is an alkyl radical and R' is a divalent saturated aliphatic hydrocarbon radical of at least four chain carbons between the free valences.

JAMES EMORY KIRBY.

REFERENCES CITED

The following references are of record in the file of this patent:

UNITED STATES PATENTS

| Number | Name | Date |
|---|---|---|
| 2,130,523 | Carothers | Sept. 30, 1938 |
| 2,574,554 | Fischer | Nov. 13, 1951 |

OTHER REFERENCES

Bentley, Journal American Chemical Soc., vol. 70, 1948, pages 2183 to 2185.

Lipmann et al., Journ. Biological Chem., vol. 153, 1944, pages 581 and 582.